United States Patent [19]

Welander

[11] 4,435,995

[45] Mar. 13, 1984

[54] POSITIVE DRIVE DIFFERENTIAL FOR VEHICLE INCLUDING TRACTORS

[76] Inventor: Walter E. Welander, Box 449, Virginia, Minn. 55792

[21] Appl. No.: 168,439

[22] Filed: Jul. 10, 1980

Related U.S. Application Data

[63] Continuation-in-part of Ser. No. 129,034, Mar. 10, 1980, abandoned.

[51] Int. Cl.³ ............................ F16H 1/44; F16H 1/40
[52] U.S. Cl. .......................................... 74/711; 74/713
[58] Field of Search ...................... 74/710, 711, 710.5, 74/713

[56] References Cited

U.S. PATENT DOCUMENTS

| | | | |
|---|---|---|---|
| 1,017,954 | 2/1912 | Cake | 74/713 |
| 1,362,076 | 12/1920 | Blom | 74/710.5 |
| 1,704,803 | 3/1929 | Mlinko | 74/711 |
| 2,762,240 | 9/1956 | Eckert | 74/710.5 |
| 2,966,076 | 12/1960 | O'Brien | 74/710.5 |
| 3,460,404 | 8/1969 | Schmid | 74/710.5 |
| 3,517,572 | 6/1970 | Schmid | 74/710.5 |
| 3,958,464 | 5/1976 | Kronbergs | 74/710 |
| 3,974,717 | 8/1976 | Breed et al. | 74/713 |

FOREIGN PATENT DOCUMENTS

| | | | |
|---|---|---|---|
| 292133 | 5/1916 | Fed. Rep. of Germany | 74/710.5 |
| 525071 | 5/1921 | Fed. Rep. of Germany | 74/713 |
| 337772 | 6/1921 | Fed. Rep. of Germany | 74/710 |
| 379801 | 8/1923 | Fed. Rep. of Germany | 74/713 |
| 410064 | 3/1945 | Italy | 74/713 |
| 2171 | of 1906 | United Kingdom | 74/713 |

*Primary Examiner*—Allan D. Herrmann

[57] ABSTRACT

A positive drive differential which passes drive power directly to one wheel by splining one axle centrally to one side of a differential housing; and which side of the differential housing has no side differential gear. The other axle is splined into the only existing side differential gear and which also is geared to two small end differential gears or planetary gears that are journalled one-hundred and eighty degrees apart in the differential housing. The differential also contains a ring gear that is positively fastened to the differential housing and the differential housing is journalled in the ordinary manner to the axle housing by the means of ball-bearings. Similarly, the side differential gear is journalled to the differential housing by the means of ball-bearings.

2 Claims, 1 Drawing Figure

U.S. Patent
Mar. 13, 1984
4,435,995
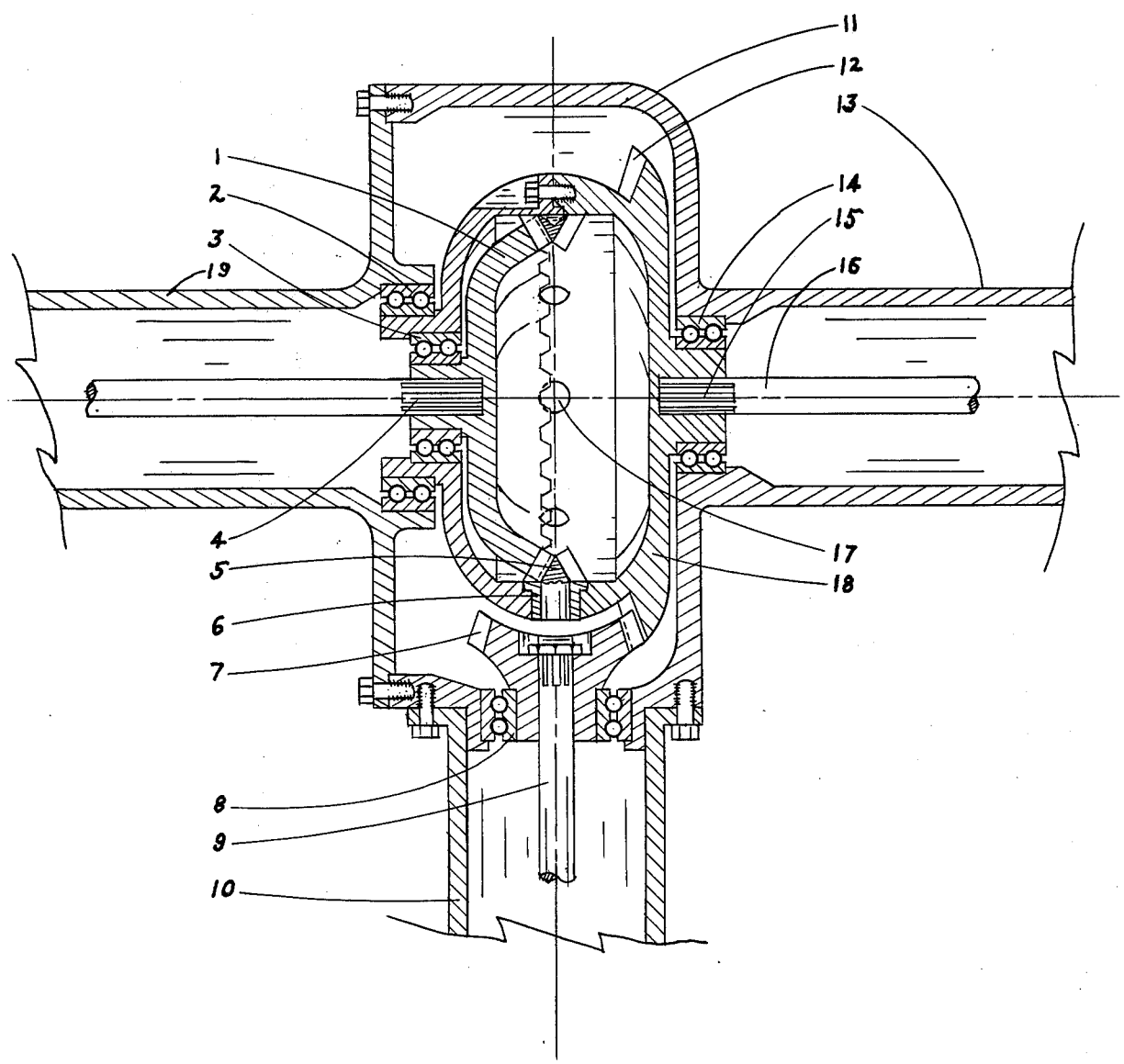

POSITIVE DRIVE DIFFERENTIAL FOR VEHICLE INCLUDING TRACTORS

CROSS REFERENCE TO RELATED APPLICATION

This application is a continuation-in-part of application Ser. No. 129,034, filed Mar. 10, 1980 now abandoned.

SUMMARY OF THE INVENTION

The primary object of this invention is to provide a positive drive differential that will transmit the power at close to 100% efficiency. If this can be done, it will become feasible to use small motors as power sources, thereby replacing previously used larger motors, and which smaller motors will produce from 50 to 100 miles on a gallon of fuel. Thus, one and two cylndered, two-cycle engines could replace the larger, previously used engines. It is expected, though, that the smaller engines would possibly require modern features such as fuel injection, electronic ignition and would use fuel oil as the fuel.

BRIEF DESCRIPTION OF THE DRAWINGS

FIG. 1 shows a top, cross-sectional view of the present drive differential, its various components and their relative placement to each other.

DESCRIPTION OF THE PREFERRED EMBODIMENT

The present invention relates to drive differentials and my previous application Ser. No. 037,642, filed May 10, 1979, now abandoned. The present design is, however, different from my previous application in that one axle is now splined positively to the side of the differential housing and in that the present mechanism only contains one side differential gear, thereby breaking the gear connection connecting the two wheels as in the previous mechanism or as in ordinary differentials. Also, the mechanism of this application contains a ring gear positively fastened to the differential housing as in ordinary differentials.

Referring to FIG. 1, the present differential is shown in a full cross-sectioned view looking at it from the top of the mechanism. In particular, FIG. 1 shows the cross-sectional outline of the rear end housing (11), the axle housing (13) and (19), and the drive shaft housing (10). A cross-section of the large ring gear (12) and how it is an integral part of the differential housing (18) is also shown. Specifically, the right axle (16) is positively fastened by the means of spline (15) to the differential housing (18). Thus, as power is applied via the input or drive shaft 9, the pinion gear (7) turns the differential housing (18) and which directly turns the right axle (16), since it is positively splined thereto. It is to be noted, too, that numeral (6) is indicative of a bushing in which the small differential gears (5) turn.

Referring now to the left side of the present differential, it is to be recognized that it generally is of ordinary construction, except that now side gear (1) is spaced apart from the differential housing (18) and the rear end housing (11) by individual sets of ball-bearings (3); instead of using only bearing surfaces turning against adjacent bearing surfaces as in most ordinary differentials. Since there is no right side differential gear in this design, the gear-tie which normally connects the axles or wheels together in the ordinary differentials is broken. Oil dippers should also be fastened to the outside of the housing (18) around openings (17) so that a sufficient supply of oil will be maintained within the differential. In this fashion, oil will continue to be supplied to the mechansim as long as the oil dippers reach the oil as the differential housing (18) turns thus providing a sufficient supply of lubricant to the moving parts.

By making the above mentioned changes, the construction of the device of my previous application is simplified; and by adding only one additional set of ball-bearings, the mechanism becomes completely journalled thoughout, thereby substantialy reducing friction. Of primary importance though is the resulting large difference in size between the differential gears (5) and (1) (to be discussed in detail later) and which gears pass the power to the left wheel. In conjunction with the above changes, it is also believed that by breaking the gear connection between the wheels, as in this design, an extremely fine differentiation is achieved, thereby eliminating the longer power loss of the ordinary differential. It is further believed that the power that is passed through because of the large difference in size of the differential gears (and because of the previous statement) becomes a fine supportive force to the other wheel resulting in a unified, unslipping, positive force that pushes the vehicle forward. That is, the friction between the tires and the road when cruising on the highway always keep the wheels driving together, and therefore the gear-tie that connects the wheels together in the ordinary differentials is not needed. Transmissions though are different and this gear-tie is needed there, I believe.

In summary, the present extremely simple design provides the ultimate in differentials, whether the need is for traction or for fuel conservation.

Now getting to how the power is transferred to the side differential gear (1) and its axle (4) and directing attention to FIG. 1. The drawing shows a large difference in size between the side differential gear (1) and the small end differential gears (5), and which for the presently preferred embodiment is contemplated to be a ratio of about 14 to 1. Thus, in operation as power is applied to the differential housing (18), it is caused to turn, and which causes the small differential gears (5) engaged therewith to also turn and thereby apply power to the side differential gear (1). In response thereto, the large side differential gear (1) and its axle (4) turn, but at a speed that depends upon the speed at which the differential housing (18) is turning and which dependency is due to the fact that the end differential gears (5) can also turn in their bushings (6), independent of the side differential gear (1).

Specifically, as the differential housing (18) turns faster and faster, the small differential gears (5) cannot keep up their independent turning and thus transfer more and more power to and cause the side differential gear (1) to rotate faster and faster. This effect is believed to occur, in part, due to the use of a heavy duty nonfrictional gear lube and, induced friction between the end differential gear (5), their bushings (6) and the differential housing (18).

Stated differently, because of the great difference in size between the side differential gear (1) and the small differential gears (5), when the housing (18) turns fast due to a large application of power, it is impossible for the small end differential gears (5) to change speeds so as to keep up and turn at the speed they would otherwise have to, given the large gear ratio, and in the small instance, therefore, they in effect become locked so as to transfer power to and cause the large side differential gear (1) to turn. This locking effect thus depends upon the magnitude of the input speed or change in speed at the differential housing and which conditions are reflective of speed changes in the turning of the end differential gears (5) over a range from free turning to locked and over which range power is correspondingly transferred or not to the side gear (1).

Analogously, the effect is very similar to that in a four or five speed transmission where you can start off in low gear, but you cannot start off in high gear. For the same reason, the differential gears lock, passing the power to the other wheel when the power is applied to the differential housing (18).

The present differential, however, still allows the wheels to differentiate speeds for turns in the road, etcetera, since in those instances a slower application of power results and which allows the small differential gears to turn.

While the present invention has been described with respect to its presently preferred embodiment, it is contemplated that various changes and modifications might be made thereto. It is, therefore, anticipated that the following claims should be interpreted so as to encompass all such equivalent embodiments within the spirit and scope thereof.

What is claimed is:

1. A positive drive differential apparatus for a wheeled vehicle including drive wheels comprising, an axle housing, right and left coaxially aligned axles, a drive shaft, a pinion gear fixedly attached to and driven by the drive shaft, a differential housing having right and left hubs on opposite sides—each journaled for rotation in the axle housing by the means of ball-bearings, a ring gear fixedly attached to the differential housing, said ring gear engaging and being driven by the pinion gear on the drive shaft, said right axle being fixedly attached to said right hub of the differential housing, said left axle being fixedly attached to a left side differential gear journaled by the means of ball-bearings for rotation within the differential housing adjacent to the left hub of said differential housing, a plurality of spaced apart planetary gears journaled for rotation by the means of a bushing upon the inside of the differential housing, said planetary gears being in engagement with the left side differential gear for transmitting power from the differential housing to the left side differential gear and the axle connected thereto, said left side differential gear is as large as constructionally possible relative to the size of each of said planetary gears which are as small as constructionally possible, and because the relatively high rotational speed needed by the planetary gears compared to the housing speed cannot be attained when power or speed is applied to the differential housing the small differential gears lock instead thereby passing the power to the left axle and wheel, but allowing the axles and wheels to turn at different speeds when power is applied gradually as a result of uneven road conditions or turns.

2. The apparatus of claim 1 wherein the gear ration between the left side differential gear and each of the planetary gears is as great as is practical to construct within the differential housing.

* * * * *